Sept. 27, 1960 N. E. PEDERSEN ET AL 2,954,477

RADIATION DETECTION

Filed Jan. 22, 1959

INVENTOR.

NORMAN E. PEDERSEN
BY GEORGE J. DOUNDOULAKIS 2,954,477

RADIATION DETECTION

Norman E. Pedersen, Troy, and George J. Doundoulakis, North Bellmore, N.Y., assignors to General Bronze Corporation, Garden City, N.Y., a corporation of New York Filed Jan. 22, 1959, Ser. No. 788,337

10 Claims. (Cl. 250—211)

Figure 1:
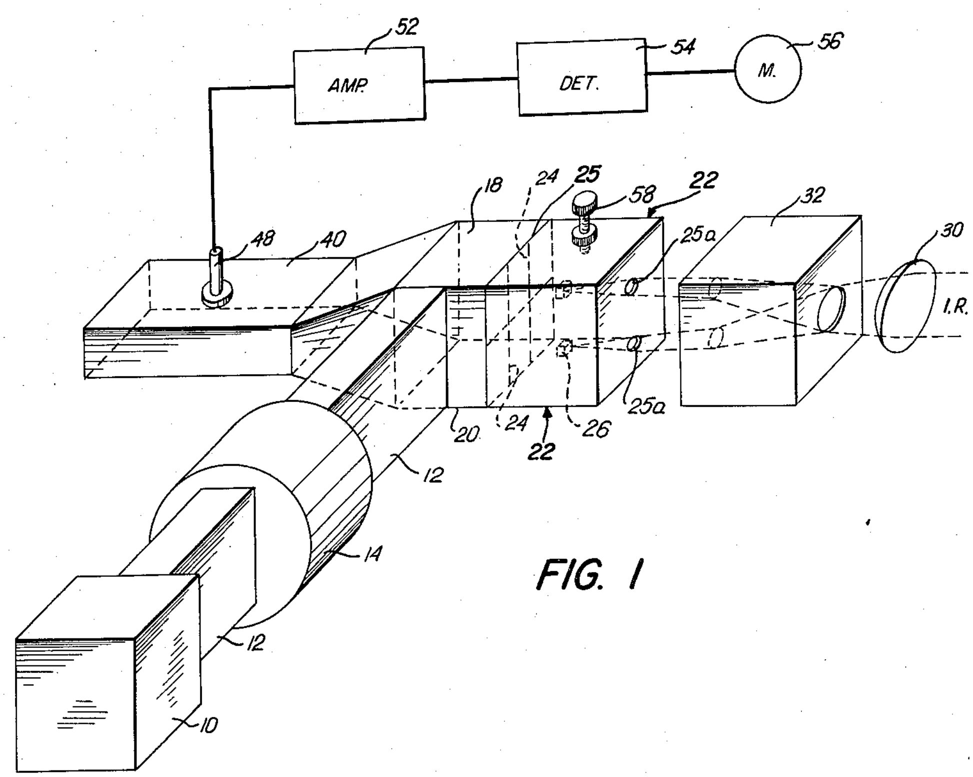

This application is a continuation-in-part of our previous application, Serial No. 719,012, filed March 4, 1958, now abandoned.

The invention relates to methods and apparatus for detection of radiation. Although the invention is particularly applicable to the detection of infrared rays, it is equally well adapted for the detection of other types of photo-radiation, such as ultraviolet rays and visible light.

In the best infrared detectors known heretofore, a cell of semiconductive material, such as lead sulfide, functions as a radiation-sensitive device, its electrical conductivity varying in accordance with the intensity of its irradiation. A biasing voltage is impressed across the semiconductive cell and variations in the resulting current level are measured as an indication of the intensity of the radiation.

A typical lead sulfide cell, having an area (A) of 1 square centimeter and an impedance (R) of ½ megohm will produce, when biased at 100 volts and excited by infrared radiation of a density (D) of 10 microwatts per square centimeter, an output signal ($e_o$) of 1.2 millivolts. Its conversion efficiency ($g$), or ratio of output power ($P_o$) to exciting power ($P_i$), may be calculated by the formula:

$$g=\frac{P_o}{P_i}=\frac{e_o2/R}{DA}=\frac{e_o2}{RDA}$$

$$g=\frac{(1.2\times10^{-3})^2}{(.5\times10^6)(10^{-5})(1)}=2.4\times10^{-7}$$

It may thus be seen that such a device is relatively insensitive and that its output signal must be amplified to many times its original value to be useful.

This type of detector has the further disadvantage that the bias current introduces a background noise effect. Moreover, considerable noise is introduced into such devices because of "current barriers"—that is junctions of metals having different contact potentials. These noise signals are, of course, amplified along with the desired signal and tend to obscure it.

The present invention provides an extremely sensitive method and apparatus for detecting infrared and other radiation—a system wherein the noise level is greatly reduced as compared to previous devices, principally due to the elimination of the conventional direct current bias and the substitution therefor of microwave radiation as a biasing agency.

In general terms, the invention accomplishes these objectives by immersing a small amount of semiconductive material in a microwave field. The semiconductive material is supported by a small piece of low-loss dielectric polyfoam material in the space between the walls of the microwave waveguide, and thus the need of the direct contacts is eliminated. The region where the semiconductive material is placed is a sharply tuned microwave cavity, which has an opening at one end to permit the radiation to be detected to impinge upon the semiconductive material. When radiant energy falls on the semiconductive material, the number of electron carriers is changed and the properties of the microwave tuned cavity also follow these changes. The amount of microwave power which is reflected by the tuned cavity is normally balanced by reference microwave power which is reflected from another similar cavity, the two signals being of equal magnitude but 180° out of phase. The second cavity may also include a similar mass of semiconductive material in order to compensate for variations in temperature and other ambient conditions. A variation of the properties of the first cavity due to the radiation produces an imbalance between the power reflected from the two cavities. This imbalance constitutes the signal which is then amplified by proper equipment. To facilitate amplification and detection, the incoming radiation may be interrupted cyclically by a "chopper" to produce a modulated R.F. signal.

Since the two cavities are feeding signals out of phase with respect to each other, the reference cavity may be closed at the end, or both cavities may be provided with openings and the incoming radiant energy may be chopped alternately at the two cavities, thus producing a push-pull operation and effectively doubling the output signal.

The radiation produces a two-fold variation of the characteristics of the tuned cavity: (*a*) the Q of the cavities is lowered because of the presence of greater number of carriers and (*b*) the effective electrical length of the cavity is changed because of the different phase shifts which are produced by semiconductive materials of different carrier content. These two effects are additive, as both increase the amplitude of the unbalance signal.

Figure 2:
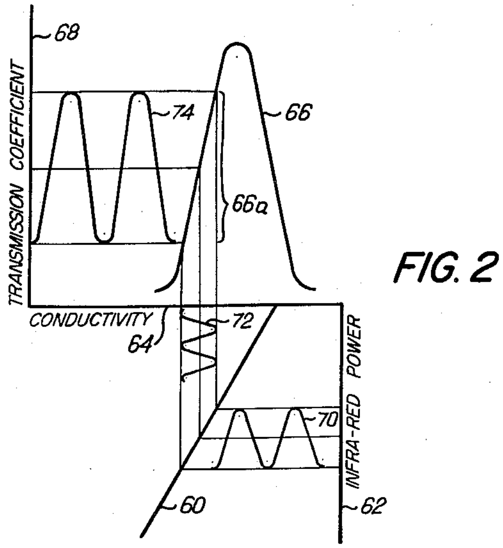

In the drawings:

Figure 1 is a simplified schematic diagram of a radiation detector embodying features of the present invention; and Figure 2 is a chart showing the effect of the resonant cavity in enhancing the overall sensitivity of the apparatus.

The illustrative embodiment of the invention shown in Figure 1 includes a microwave generator 10 which generates microwave energy, for example at a frequency of the order of 10,000 megacycles. This microwave energy, which is of constant frequency and amplitude, is coupled into a waveguide 12, for example a rectangular waveguide, which conveys the signal through a ferrite isolator 14 which insures passage of energy along the waveguide 12 only in the direction away from the generator 10.

The microwave power from guide 12 enters a conventional "magic tee" comprising the adjacent portion of the waveguide 12, a pair of waveguide sections 18 and 20 extending side by side at right angles to the waveguide section 12, and a waveguide section 40 extending parallel to the sections 18 and 20 in the opposite direction from the section 12. This arrangement functions to divide the power equally between the waveguides 18 and 20 which lead respectively to a pair of tuned cavities 22 each of which contains a semiconductor 26. As will be readily understood by those familiar with the operation of a "magic tee," any signal reflected from the cavities 22 back along the respective waveguides 18 and 20 is coupled into the waveguide section 40 in opposing phase relation—that is to say, the energy coupled from the section 18 into the section 40 is in opposition to that coupled from the section 20 into the section 40. Thus, if the reflection from each of the two cavities 22 is equal, these two components will cancel and no signal will be fed into the waveguide section 40; instead, all of the reflected signal will pass back up the waveguide section 12 and be absorbed in and dissipated by the ferrite isolator 14. If, on the other hand, there is a change in the characteristics of one of the two cavities 22 which causes a difference in either the amplitude or the phase of the two signals reflected back along the respective waveguide sections 18 and 20, a signal proportional in amplitude to the difference will be fed into the waveguide section 40.

The two tuned cavities 22 are identical. They each consist of a length of waveguide defined by an inductive iris 24 at one end and a thin metal wall 25 at the other, the spacing between the iris 24 and the wall 25 being approximately one-half wavelength of the waveguide at the frequency of the generator 10. The endwall 25 of each cavity is provided with a small, tuned aperture 25*a*, which allows radiation to be focused through it onto the semiconductive material 26 inside the cavity. The semiconductive material, for example, is in the form of a cube one millimeter on each side; it is supported at the geometrical center of the cavity by polyfoam dielectric or other low loss tangent and dielectric constant material. The type of semiconductive material to be used and the temperature at which it will care to be held depends on the wavelength of the radiation to be conducted. For infrared, this may be gold-doped, copper-doped or zinc-doped germanium.

An optical system, here schematically represented as a pair of lens 30, serves to focus the infrared rays IR on one or the other of the two semiconductors 26, through a "chopper" 32, which, although not shown in detail, is a combination of mirrors and/or prisms, at least one of which is oscillated or rotated to cause the infrared rays from the lens 30 to be directed upon first one and then the other of the two semiconductors 26, alternating between them at a predetermined cyclical rate.

When infrared radiation impinges upon one of the semiconductors 26, the infrared photons excite electrons of the semiconductor from the normally filled (valence) band across the energy gap into the normally empty (conduction) band. These electrons remain in the conduction band for a period of time which is greater than the period of oscillation of the microwave energy, during which time they are accelerated by the microwave field. The mean free path of these electrons is quite small and many collisions will occur, resulting in transfer of energy to the semiconductor lattice in many phases. Microwave energy will thus be absorbed from the microwave field and converted into thermal energy, changing the amplitude of the reflected signal.

This change in conductivity of the semiconductor will lower the Q of the cavity 22 and allow more power to pass through it when slightly off resonance. This change in conductivity of the semiconductor will also have a reactive effect on the tuning of the cavities 22, changing the phase of the reflected signal.

The change in both amplitude and phase of the signal reflected back along the waveguide section 18 from the cavity upon which radiation is impinging at any instant will, of course, produce an imbalance between the signal energy reflected from the two cavities, the degree of imbalance being a function of the number of infrared photons acting upon the semiconductor 26 in a given time interval. The imbalance signal, which is coupled into the waveguide section 40, may then be detected and measured as a measure of the intensity of the radiation.

In the particular apparatus shown in Figure 1, the detecting circuit includes a crystal 48 which is mounted in the waveguide section 40 and which rectifies the imbalance signal. Due to the action of the chopper 32, the output of this crystal detector is a periodic wave form having a frequency equal to the chopping rate. This signal, which is typically in the audio-frequency range, is fed to an indicating device which illustratively may include an audio-frequency amplifier 52 selectively responsive to signals at the chopping frequency, and a second detector or rectifier 54 which produces a D.C. output voltage which may be fed to a visual indicating device 56, such as a meter or recorder or cathode ray tube. The system is balanced for zero reading of the indicating device 56 with the apertures 25*a* masked. This is done, for example, by adjustment of a tuning screw 58 in one of the cavities 22. Thus, when the apertures are unmasked, the reading of the device 56 will be a function of the intensity of radiation impinging upon the semiconductors 26.

Even a very small amount of infrared radiation will produce a large imbalance of energy in the waveguide section 40 and a substantial reading on the indicator 56. The device is, therefore, extremely sensitive. Assuming a quantum efficiency of unity (that is, that the number of electrons excited into the conduction band is equal to the number of incident photons—a condition which is closely approximated in practice), a conversion efficiency for gold-doped germanium on the order of unity may be calculated. This means that the overall sensitivity of the present system is roughly 10 million times greater than that of the D.C.-biased lead sulfide cell of the prior art.

The elimination of the conventional biasing current avoids the noise introduced by the biasing current. Moreover, the gold-doped germanium can be used at very cold temperatures, for example the temperature of liquid nitrogen. At such temperatures, the thermal noise level is extremely low. Thus, the signal-to-noise ratio of the system is high, and the signal can be amplified to useful levels without a prohibitive level of amplified noise.

The effect of each of the two resonant cavities 22 on the overall gain of the system is illustrated in Figure 2. In this figure, the line 60 is a plot of the characteristics of the semiconductor, the ordinate 62 representing units of infrared power and the abscissa 64 representing units of conductivity of the semiconductor. The curve 66 represents the characteristics of the resonant cavity 22 wherein the common abscissa 64 represents the conductivity of the semiconductor and the ordinate 68 represents the transmission coefficient of the cavity 22 (that is, the ratio of reflected power to incident power). The wave form 70 represents the amplitude of the incident infrared power, as modulated by the chopper 32 (Figure 1). This infrared power acts upon the semiconductor 26 (Figure 1 to produce a periodic change in its conductivity as represented by the wave form 72. These changes in the conductivity of the semi-conductor 26 produce corresponding changes in the tuning of the cavity 22 and accordingly in its transmission coefficient, as indicated by the wave form 74. The cavity 22 is operated slightly off resonance, on a portion 66*a* of the curve 66 where the curve is comparatively linear and has a very steep slope. This steepness of the slope of the portion 66*a* of the curve 66 causes the amplitude of the wave form 74 representing the periodic change in transmission coefficient of the cavity to be quite large as compared to the change in conductivity of the semi-conductor as represented by the wave form 72.

In other words, the resonant cavities 22 act as "ideal" (noise-free) amplifiers with an amplification factor of $Q/\pi$.

Since the two cavities operate in "push-pull," the effective output signal is doubled. When the cavities are adjusted for identical Q as well as center frequency, the system acts to eliminate fluctuations in both frequency and amplitude of the microwave source 10 as seen at the detector 48. Thus, the system can be made to double infrared sensitivity and, at the same time, cancel residual source noise.

The system disclosed is thus suitable for applications where extremely high sensitivity and low noise level are of paramount importance. For example, it may be used in search systems for detecting aircraft at extreme ranges. Similarly, it may be used in a fire-control system or in a missile-to-missile homing system. It may also be used with a scanning arrangement for making infrared photographs or for night observation.

Other semiconductors than copper, gold and zinc doped germanium may, of course, be used as the semiconductor 26. For example, lead sulfide, indium antimonite and selenium telluride are possible satisfactory substitutes, depending upon the type of radiation to be detected. The basic requirement is that the energy gap of the material be sufficiently small that electrons in the valence band may be caused to jump the forbidden band and enter the conduction band when excited at the energy level of the photons to be detected.

As is well known, the energy level of a photon of radiation is proportional to its frequency, being expressed by the formula $E=hV$, wherein $h$ is Planck's constant and V is the frequency. Thus, in detecting radiation at very short wave lengths, such as ultraviolet, even intrinsic germanium and similar material having a relatively large energy gap may be used.

From the foregoing description, it will be appreciated that the present invention provides a method and apparatus for detecting radiation which is more sensitive and has a higher signal/noise ratio than any system known heretofore. However, it should be emphasized that the particular embodiments of the invention which are shown or disclosed herein are intended as merely illustrative of the principles of the invention rather than as restrictive of the scope thereof or of the covering of this patent, which is defined only by the appended claims.

We claim:

1. A radiation detector comprising a radio-frequency generator, a first transmission device coupled to said generator to receive radio-frequency energy therefrom, a semiconductor in energy-absorptive relation to said first transmission device, said semiconductor being arranged in the field of the radiation to be detected, a second transmission device coupled to said generator, a detector arranged to receive radio-frequency energy from said two transmission devices in opposing phase relation, means for balancing the amplitude of the radio-frequency energy transmitted to said detector by said first and second transmission devices in the absence of radiation in said field, whereby said detector will indicate an imbalance of such radio-frequency energy dependent upon the intensity of the radiation in said field.

2. A radiation detector comprising a microwave generator, a first waveguide section coupled to said generator to receive microwave energy therefrom, a semi-conductor mounted in said first waveguide section, an optical opening in said first waveguide section for permitting the radiation to be detected to impinge upon said semiconductor, a second waveguide section coupled to said generator to receive microwave energy therefrom, a third waveguide section coupled to said first and second waveguide sections to receive said microwave energy therefrom in opposing phase relation, and a detector coupled to said third waveguide section to detect the imbalance of the microwave energy received therein from said first and second waveguide sections.

3. A radiation detector comprising a microwave generator, a first waveguide section coupled to said generator to receive microwave energy therefrom, a semiconductor mounted in said first waveguide section, an optical opening in said first waveguide section for permitting the radiation to be detected to impinge upon said semiconductor, a chopper in the path of said radiation to cause periodic interruption of the excitation of said semiconductor thereby at a predetermined frequency, a second waveguide section coupled to said generator to receive microwave energy therefrom, a third waveguide section coupled to said first and second waveguide sections to receive said microwave energy therefrom in opposing phase relation, and detector means sensitive to microwave signals modulated at said predetermined frequency to detect the periodic imbalance of microwave energy transmitted thereto by said second and third waveguide sections.

4. A radiation detector comprising a microwave generator, a first waveguide section coupled to said generator to receive microwave energy therefrom, a semiconductor mounted in said first waveguide section, said semiconductor being arranged in the field of the radiation to be detected, a chopper in the path of said radiation to cause periodic interruption of the excitation of said semiconductor thereby at a predetermined frequency, a second waveguide coupled to said generator to receive microwave energy therefrom, a third waveguide section coupled to said first and second waveguide sections to receive said microwave energy therefrom in opposing phase relation, a local oscillator coupled to said third waveguide, a first detector coupled to said third waveguide to detect an intermediate frequency product of the frequencies of said generator and local oscillator, an intermediate frequency amplifier coupled to said detector for amplifying such intermediate frequency signal, a second detector coupled to said intermediate frequency amplifier for detecting the modulating signal at said chopping frequency, an amplifier coupled to said second detector and selectively responsive to signals at said predetermined chopping frequency, and indicating means coupled to the latter said amplifier for indicating the amplitude of the chopping frequency signal.

5. A radiation detector comprising a microwave generator, a first waveguide section coupled to said generator to receive therefrom microwave energy at a predetermined frequency, a cavity resonant at said frequency coupled to said first waveguide section, a semiconductor mounted in said cavity, an optical opening in said cavity for permitting radiation to impinge upon said semiconductor, a second waveguide section coupled to said generator to receive microwave energy therefrom, a third waveguide section coupled to said first and second waveguide sections to receive said microwave energy therefrom in opposing phase relation, and a detector coupled to said third waveguide section to detect the imbalance of the microwave energy received therein from said first and second waveguide section.

6. A radiation detector comprising a microwave generator, a first waveguide section coupled to said generator to receive therefrom microwave energy at a predetermined frequency, a cavity resonant at said frequency coupled to said first waveguide section, a semiconductor supported near the geometric center of said cavity by a dielectric material, an optical opening in said cavity for permitting radiation to impinge upon said semiconductor, a second waveguide section coupled to said generator to receive microwave energy therefrom, a third waveguide section coupled to said first and second waveguide sections to receive said mircowave energy therefrom in opposing phase relation, means for balancing the amplitude of microwave energy transmitted to said third waveguide section in the absence of radiation, and a detector coupled to said third waveguide section to detect the imbalance of the mircowave energy received therein from said first and second waveguide sections.

7. The invention as claimed in claim 6 wherein said dielectric material is a foam resin which substantially fills said cavity.

8. A radiation detector comprising a microwave generator operating at a predetermined frequency, a pair of cavities resonant at said frequency coupled to said generator, semiconductors mounted in each of said cavities, an optical opening in at least one of said cavities for permitting the radiation to be detected to impinge upon said semiconductor, waveguide means coupled to said cavities to receive microwave energy respectively therefrom in opposing phase relation, means for varying the relative amplitudes of the microwave energy thus transmitted to said waveguide means from said cavities to balance the same in the absence of said radiation, and detector means coupled to said waveguide means to detect the imbalance of the microwave energy received therein from said first and second waveguides.

9. A radiation detector comprising a microwave generator operating at a predetermined frequency, a pair of cavities resonant at said frequency coupled to said generator, semiconductcors mounted in each of said cavities for absorption of varying quantities of microwave energy dependent upon the number of electrons of said semiconductor in the conduction band, an optical opening in each of said cavities for permitting the radiation to be detected to impinge upon the semiconductors therein, a chopper in the path of said radiation to cause periodic interruption of the excitation of said semiconductors in alternation at a predetermined modulation frequency, waveguide means coupled to said cavities to receive said microwave energy therefrom in opposing phase relation, and detector means coupled to said waveguide means to detect the imbalance of the microwave energy received therein from said first and second waveguides.

10. A radiation detector comprising a microwave generator operating at a predetermined frequency, a pair of cavities resonant at said frequency coupled to said generator, semiconductors mounted in each of said cavities for absorption of varying quantities of microwave energy dependent upon the number of electrons of said semiconductor in the conduction band, optical openings in each of said cavities for permitting the radiation to be detected to impinge upon said semiconductors, chopper means in the path of said radiation to interrupt the excitation of said semiconductors in alternation at a predetermined modulating frequency, waveguide means coupled to said cavities to receive said microwave energy therefrom in opposing phase relation, means for varying the amplitude of microwave energy transmitted to said waveguide means from at least one of said cavities to balance the energy received by said waveguide means in the absence of radiation, and detector means coupled to said waveguide means to detect the imbalance of the microwave energy received therein from said first and second waveguides.

References Cited in the file of this patent

UNITED STATES PATENTS

| | | |
|---|---|---|
| 2,562,281 | Mumford | July 31, 1951 |
| 2,605,323 | Samuel | July 29, 1952 |
| 2,819,453 | Cohn | Jan. 7, 1958 |
| 2,832,045 | Sharpless | Apr. 22, 1958 |
| 2,844,737 | Hahn et al. | July 22, 1958 |
| 2,844,789 | Allen | July 22, 1958 |